US005666830A

United States Patent [19]

Litvin

[11] Patent Number: 5,666,830

[45] Date of Patent: Sep. 16, 1997

[54] SECURITY LOCK, WITH FREE OPENING FROM INDOORS

[76] Inventor: Noel Litvin, GCG&Asoc.-San Martin 686-7º“72” , 1004 Buenos Aires, Argentina

[21] Appl. No.: 264,772

[22] Filed: Jun. 23, 1994

[51] Int. Cl.[6] .................. G05B 65/06

[52] U.S. Cl. .................. 70/129; 70/417; 70/467; 70/468; 292/335; 292/165; 292/167

[58] Field of Search .................. 70/129, 134, 467, 70/468, 485, 487, 150, 152, 417; 292/165, 167, 332, 335

[56] References Cited

U.S. PATENT DOCUMENTS

| | | | |
|---|---|---|---|
| 667,297 | 2/1901 | Crawford | 70/150 |
| 936,134 | 10/1909 | Keil | 292/165 |
| 963,450 | 7/1910 | Lowe | 292/337 |
| 2,464,603 | 3/1949 | Oxhandler | 70/150 |
| 2,483,368 | 9/1949 | Ledin | 292/165 |
| 3,361,464 | 1/1968 | Foster | 292/165 |
| 3,621,686 | 11/1971 | Klein | 272/167 |
| 3,672,714 | 6/1972 | Schultz | 292/165 |
| 3,769,827 | 11/1973 | Yulkowski | 70/152 |
| 3,948,066 | 4/1976 | Solovieff | 70/129 |
| 4,108,482 | 8/1978 | Dietrich et al. | 292/165 |
| 4,141,234 | 2/1979 | Hoos | 70/450 |
| 4,272,974 | 6/1981 | Hennessy | 70/134 |
| 4,338,804 | 7/1982 | Solovieff | 70/134 |
| 4,372,594 | 2/1983 | Gater | 292/1.5 |
| 4,397,168 | 8/1983 | Rotondi et al. | 70/452 |
| 4,739,638 | 4/1988 | Lin | 70/129 |
| 5,040,393 | 8/1991 | Rossebo | 70/451 |
| 5,342,101 | 8/1994 | Shih | 292/165 |

*Primary Examiner*—Darnell M. Boucher
*Attorney, Agent, or Firm*—J. Sanchelima

[57] ABSTRACT

A security lock having a main locking bolt connected to a U-shaped tail member slidably mounted in a housing secured to the door. The U-shaped tail member has an upper branch engaged by a turnable driving arm for movement between a retracted unlocked position for the main bolt and an extended locked position therefor. A spring biasses the driving arm to move the U-shaped tail member to the extended locked position. A key cylinder and an interior handle are connected to the driving arm to turn the arm and unlock the bolt. A spring-loaded latch is biassed to engage the lower branch of the U-shaped tail member in the retracted unlocked position. In the closed position of the door, the latch releases the U-shaped tail member which, under the action of the spring, drives the main bolt to its locked position. The latch can be operated when the door is open to release the U-shaped tail member so the main bolt extends from the lock. A first security member at the inside of the door prevents opening of the door by the interior handle unless released. A second security member at the inside of the door prevents opening of the lock by the key.

16 Claims, 3 Drawing Sheets

Fig. 1
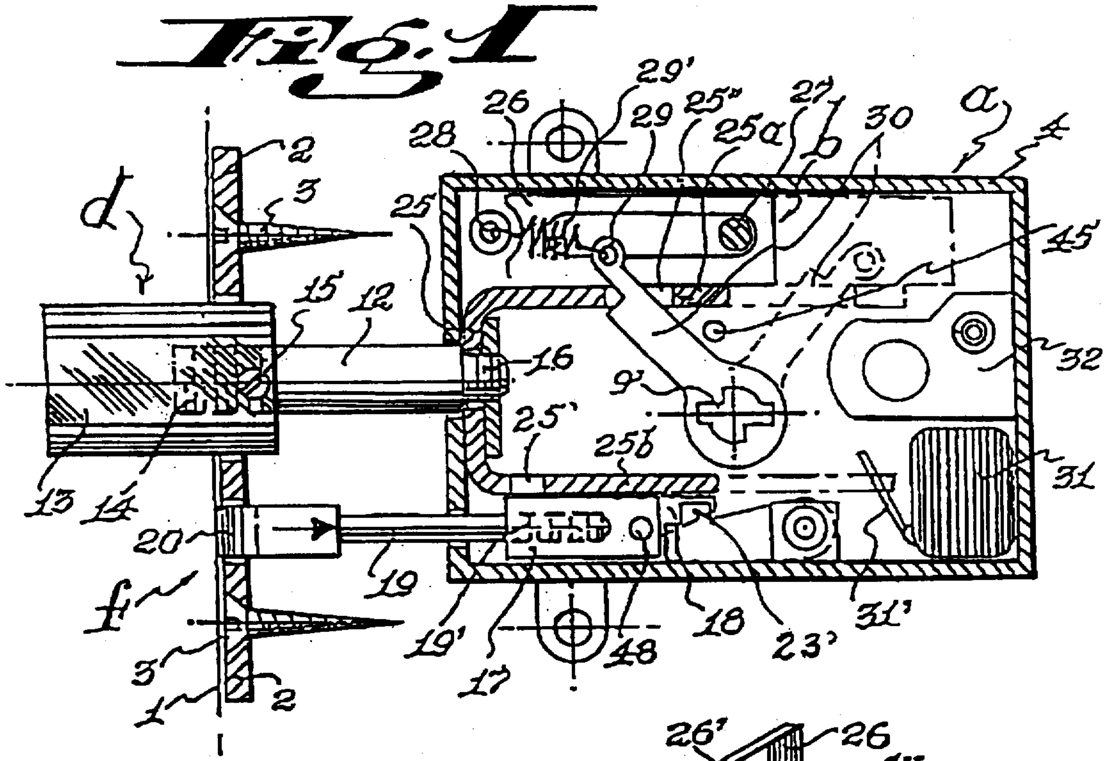
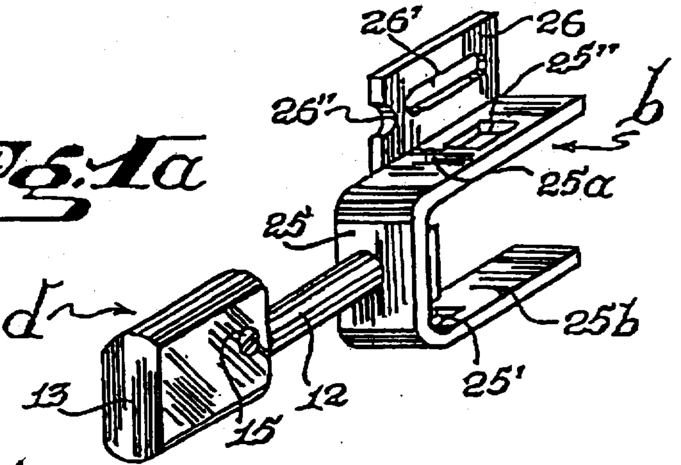
Fig. 1a
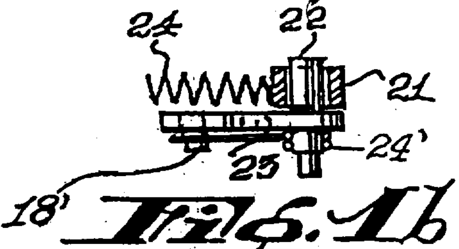
Fig. 1b
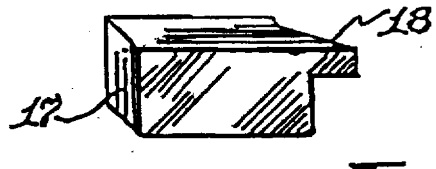
Fig. 1c
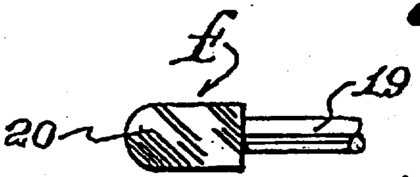
Fig. 1d Fig. 2
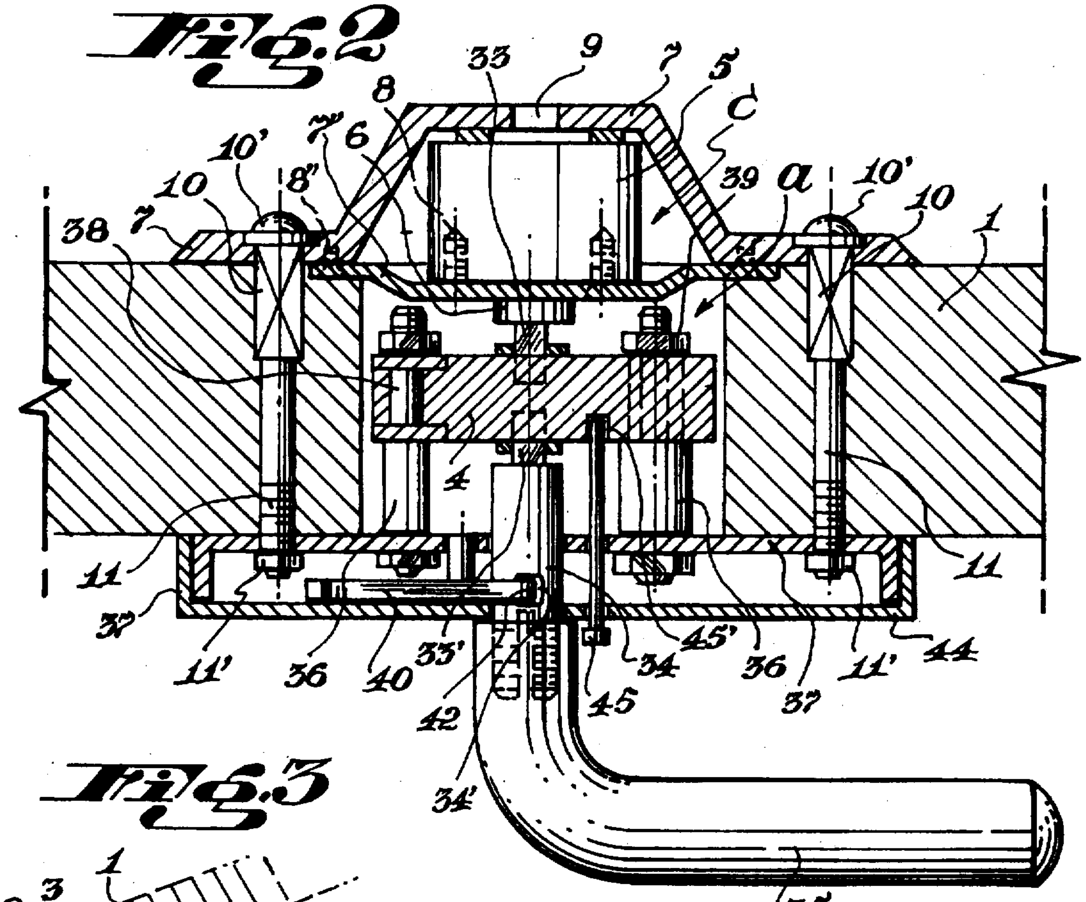
Fig. 3
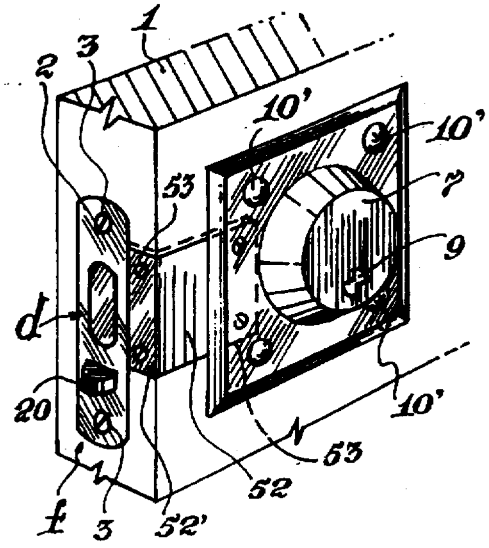
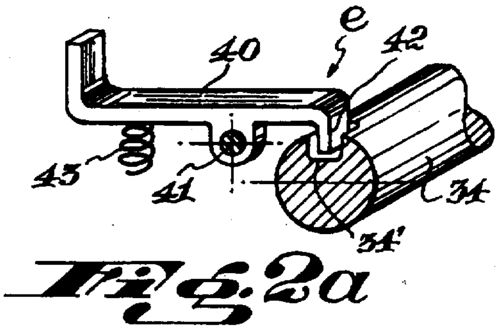
Fig. 2a Fig. 4
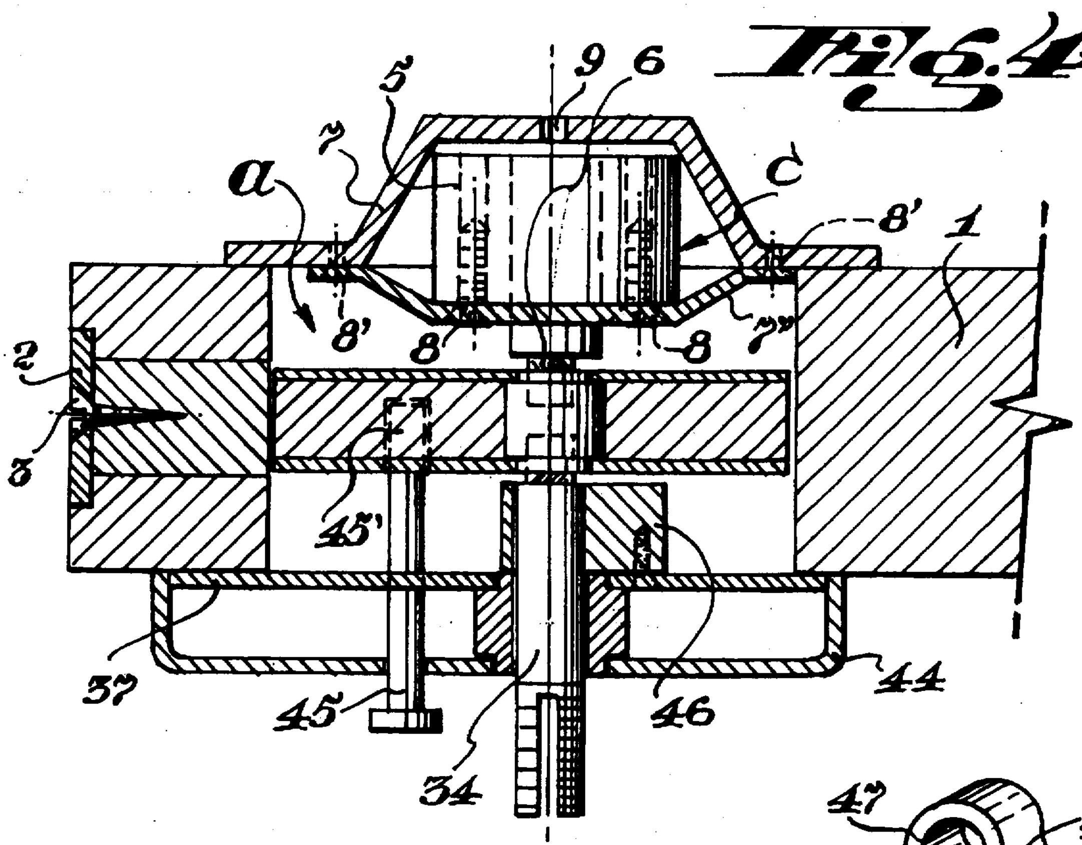
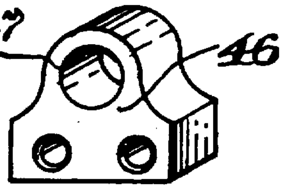
Fig. 4a
Fig. 5
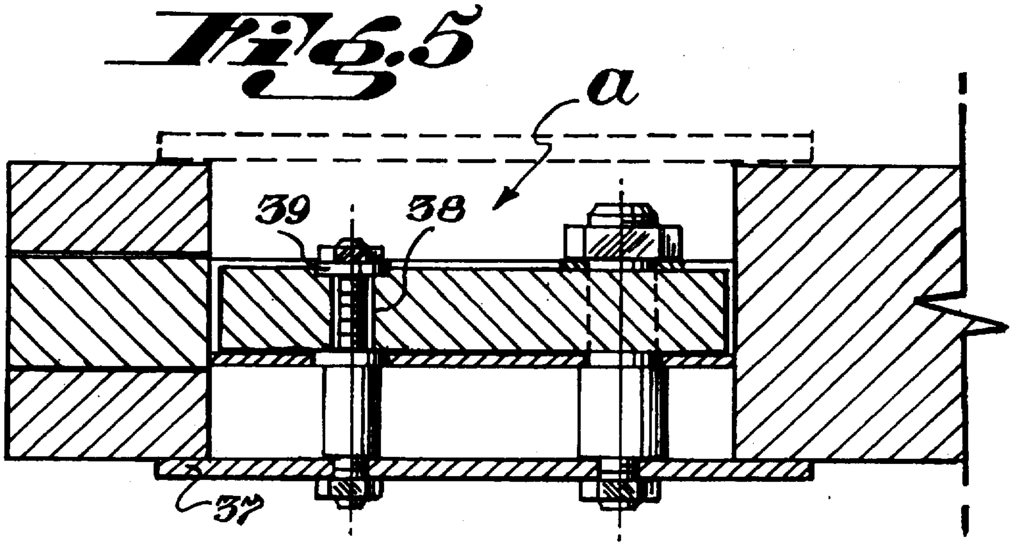

SECURITY LOCK, WITH FREE OPENING FROM INDOORS

FIELD OF THE INVENTION

The present invention relates to a security means and more particularly to a lock for which has improved security and which is freely operable from the inside.

BACKGROUND

In a conventional lock, a key is inserted into a key cylinder to rotate a driving arm which, in turn, displaces a security bolt into a locking recess in a door frame to lock the door to the frame.

Such a lock may also include a spring bolt normally urged outwardly from the door, to act as a cam that is retracted when the door is closed.

Also known are locks that are locked by a key from the inside or outside. Such locks employ a double cylinder operable by the same key. Also known are locks that require the use of a key only from outside, while from the inside they are opened freely by turning a knob or handle whose angular displacement produces directly retraction of the bolt and as soon as the door is closed, a spring returns the bolt automatically to its projected locking state. The locks have the advantage that, in case of emergencies such as a fire, for example, they can be opened without a key. However, they have the disadvantage that the door can be easily opened by children or the mentally handicapped without supervision.

Other problems that are usually found in conventional locks with free opening from the inside is that, each time a person wishes to go out even for a few moments, the person must take the precaution of taking the key to get back in as, otherwise, the door might close accidentally (for example, due to the wind) leaving the person locked out.

Since the key cylinder of the lock must have its key opening accessible from the outside, it then results that the simplest and commonest way of destroying such a lock is by directly forcing the cylinder by means a perforating instrument or the like. There are disadvantages in the installation of the locks which make the system more expensive.

Thus, for example, not all the doors have the same distance between its door edge and the door frame and all the locking means may not have enough depth so as to easily engage the locking bolt which requires the installers to take measures and adjustments, with the consequent loss of time.

Another disadvantage is that all doors do not open from the same side; and since the bolt of the lock has one face that operates as a cam while the other face operates as a locking means, it is necessary to manufacture locks for left opening, and right opening doors with the corresponding production complications.

SUMMARY OF THE INVENTION

An object of the invention, it so provide a new improved door lock which opens with a key from the outside, but which can be opened freely from the inside without a key.

This lock is simple in construction and overcomes the problems set forth of the conventional locks.

One object of the invention is to armor the lock and limit access to the key cylinder from outside so that forcing of the lock thereat is avoided.

Another object of the invention is to provide a novel and simple connection between the stem of the bolt and the driving arm projecting from the key cylinder.

Another object of the invention is to provide a new type of latching means for retention of the bolt, when the door is open, and at the same time, in conjunction with a spring, it acts as a trigger of said bolt which is normally urged to a locking position.

Another object of the invention, is to permit the latching means to prevent inadvertent locking of the door, so as to avoid locking the door accidentally while the occupant is outside.

Another object of the invention, is to provide an additional security device that must be operated from the inside before the door can be opened directly thereby inhibiting opening of the door by children, old people or the mentally handicapped. At the same time, this additional security device, is useful as a reminder to the operator that when going out he or she must take the key to open the door from the outside afterwards.

Another object of this invention, is to provide means to regulate the length of the bolt and the latch, according to necessity, directly by the installer in a simple way.

Another object is to produce a lock which can be used either for left or right opening doors based on a particular profile of the latch.

Another object it so provide assembly of the lock to the door, by spike screws that firmly connect the external part or armoring with a supporting plate disposed at the inside of the door.

Another object is to prevent the forcing of the lock by mounting the spike screws so that their heads cannot be held by tools nor can the screws be rotated so as to be unscrewed.

Another object is to provide an additional armoring for the bolt and the latch, in the area of the door that goes from the lock to the front edge of said door.

Another object of the invention is to prevent operation of the lock by the presence of an additional blocking member operable from the inside so, if necessary, the lock cannot be opened from the outside even with the key. The purpose of this additional blocking means is to increase security as, for example, when a key is lost and the door can be kept closed securely until a change in the key cylinder is obtained.

Another object is to increase the security provided by the external armoring by a special configuration of the inlet opening for the key, as the numeral eight to avoid its forcing with drills. This configuration, although known is beneficial when applied in combination with the armoring of the cylinder.

Another object of the invention is to provide a microswitch inside the device, so that when the door is opened, a conventional alarm circuit is activated for a given time period.

Finally, the new lock has been conceived in such manner that it can be applied as a lock within the door as well as fixed against the internal face of the door.

BRIEF DESCRIPTION OF THE FIGURES OF THE DRAWING

FIG. 1 is a cross-sectional view of the lock of the present invention.

FIG. 1*a* is a front, top perspective view of a portion of the lock in FIG. 1.

FIG. 1*b* is a top, plan view of another portion of the lock in FIG. 1.

FIG. 1*c* is a perspective view of an element of the lock in FIG. 1.

FIG. 1*d* is a plan view of another element of the lock in FIG. 1.

FIG. 2 is a longitudinal, sectional view of the security lock of the invention installed in a door.

FIG. 2*a* is a front, perspective view, on enlarged scale, of a detail of the lock in FIG. 2.

FIG. 3 is a schematic perspective view of the lock according to the invention shown installed at the edge of a door and seen from the outside.

FIG. 4 shows the lock in FIG. 3 in a sectional plane at right angles to that in FIG. 3.

FIG. 4*a* is a perspective view of an element of the lock illustrated in FIG. 4.

FIG. 5 is a sectional view through the lock of FIG. 4 showing a portion thereof.

FIG. 6 is a front view of the lock installed on a door adjacent to the door frame and seen from the inside.

FIG. 7 is a sectional view through the lock in FIG. 6.

DETAILED DESCRIPTION OF PREFERRED EMBODIMENTS

Referring to the drawings, the security lock is comprised of a number of main sub-combination elements comprising a housing a, a key-operated actuator means b, a key cylinder c, a main bolt d, a blocking mechanism e to prevent rotation of an inside actuator handle 35 and a latch f.

Referring to FIGS. 1–5 the security lock is applied to a door 1 and includes a guide plate 2 fixed to an edge of the door and provided with openings for passage of bolt d and latch f. The guide plate 2 is fixed to the door by screws 3. Mounted in a bore provided in the door 1 is the housing a. The housing a is in the form of a hollow box having walls 4. The key cylinder c has a body 5 with an end 6 for operating the actuator means b. The body 5 of the key cylinder c is covered at the outside of the door by an armor cover plate 7. The plate 7 is made of steel and is at least 3 mm thick. The plate 7 has a truncated conical shape to inhibit its engagement by tools. The body 5 of the key cylinder is supported by a support plate 7" and the support plate 7" and cover plate 7 are secured together by screws 8'. A slot 9 is formed in cover plate 7 for insertion of a key into a key slot 9' in the cylinder body 5. The slot 9 preferably has the shape of numeral eight. Spike screws 10 secure the cover plate 7 to the door 1. The screws 10 have square shank portions secured in the door to prevent rotation of the screws 10 from the outside. The ends of the screws 10 are partly recessed in the cover plate 7 so that only round heads 10' of screws 10 are exposed at the outside face of cover plate 7. Thereby, the heads cannot be readily engaged by tools nor can the screws be cut from the outside. The screws 10 are threaded at ends 11 and nuts 12 engage the threaded ends 11 to secure the cover plate 7 to a support plate 37 at the back of the door.

The main bolt d comprises a stem 12 threadably engaged in a threaded bore in a head 13. Thereby, the overall length of the main bolt d can be adjusted by means of the threaded engagement between the head 13 and stem 12. A lock screw 15 secures the head 13 and stem 12 in an adjusted position for the length of the main bolt d. The stem 12 has a threaded end 16 connected to the base of a U-shaped tail member 25. The U-shaped tail member 25 has an upper branch **25*a* and a lower branch 25*b*** connected by the base.

The latch f comprises a plunger 17 slidable in housing a, the plunger 17 having a rear projecting tooth 18 with a lower inclined ramp surface best seen in FIG. 1. A stem 19 of a head 20 of latch f has a threaded end 19' threadably connected to plunger 17 to adjust the overall length dimension of the latch f. The latch head 20 has a symmetrically rounded end for use in left and right opening doors.

A blocking arm 23 serves to block movement of main bolt d by engaging the U-shaped tail member 25 when the latter is in a retracted position. Namely, when bolt d is retracted, a tooth 23' on blocking arm 23 enters an opening 25' in the lower branch **25*b* of the U-shaped tail member 25 to lock the bolt d in the retracted position. A spring 24 is connected to the blocking arm 23 to rotate an axle arm 22 of the blocking arm 23 in a bearing 21 to bias the tooth 23' to engage in opening 25' in the lower branch 25*b*** of the U-shaped tail member.

The upper branch **25*a* of the U-shaped tail member has an opening 25" in which a driving arm 30 of actuator means b is loosely engaged. A wing 26 extends upwardly on branch 25*a* at right angles to the branch 25*a*, as seen in FIG. 1*a*, and the wing 26 serves to guide the U-shaped tail member 25 in its retraction and extension movements with the bolt d. For this purpose, the wing 26 has a longitudinal slot 26' in which is slidably fitted a guide pin 27 fixed to housing a. A biassing spring 29' has one end fixed to a free end 29 of driving arm 30 and an opposite end fixed to an abutment 28 secured to housing a. The wing 26 has a recess 26" which abuts against abutment 28 under the bias of spring 29' when the bolt d is in its extended position. When the driving arm 30 is rotated by turning the key in the cylinder body 5, the guide pin 27 rides in slot 26' and the bolt d is displaced to its retracted position at which tooth 23' in blocking arm 23 enters opening 25'**.

A switch 31 is mounted in the housing a and has a contact 31' positioned to be contacted by the lower branch **25*b*** of the U-shaped tail member when the bolt d is retracted.

A metallic brace 32 is mounted in housing a to maintain its wall spacing.

Referring to FIG. 2, therein is shown a drive shaft 33 of the key cylinder c. The drive shaft 33 is engaged in slot 9' in drive arm 30 for opening the lock from the outside by inserting the key into the key cylinder and turning the key and drive shaft 33 therewith. At the interior side of housing a, a drive shaft 33' of a stem 34 of the interior door handle 35 is also engaged in slot 9' in drive arm 30. By turning the interior door handle 35, the door is unlocked and can be opened. The stem 34 is provided with a notch 34' by which, the turning of the handle 35 is prevented as will be explained later.

The housing a is secured within the bore in the door by bolts 38 whose heads are engaged with support plate 37 fixed to the inside face of the door by screws 10 and whose ends are engaged by nuts 39 bearing against the housing a. The spacing of the housing a from the support plate 37 is maintained by spacer sleeves 38 interposed between the housing a and the support plate 37 and surrounding the bolts 38. A lever 40 serves as a first interior security means to selectively block rotation of handle 35. The lever 40 is pivotally supported on a pivot pin 41 and is provided with a tooth 42 for engaging in the notch 34' in stem 34 to block rotation of the handle 35. A spring 43 acts on lever 40 to bias the lever to engage the tooth 42 into the notch 34'. The support plate 37 is provided with a cover 44 which encloses the screws 10 and bolts 11, the lever 40 being accessible through a hole (not shown) in the cover 44 to release the lever 40 and permit the handle 35 to be turned.

A second interior security means comprises a security bolt 45 which is axially displaceable from inside the door to shift the bolt 45 into a locking position in which the bolt 45 engages in a notch 45' whereat the bolt is positioned in the path of travel of driving arm 30 (see FIG. 1) to prevent rotation of the driving arm. Thereby, the lock will be prevented from being opened from the outside by the key. In order to support the inner end of the stem 34, a guide member 46, FIG. 4*a*, is secured to the support plate 37 and rotatably receives the stem 34 in a bore 47 in guide member 46.

A releasable locking means 48 is provided to prevent movement of plunger 17 and thereby of latch f.

Referring to FIG. 3, therein is seen an armoring or reinforcing member 52 for protecting the locking bolt d, the member 52 having a bent end portion 52' extending over the edge of the door. The reinforcing member 52 is secured to the door by screws 53 which are covered at the outside of the door by armor plate 7 so that the bolts are not visible when the door is closed. The reinforcing member 52 protects the bolt d and optionally also latch f to prevent access thereto from the outside.

The presence of blocking mechanism e serves as a means to require an additional action to the operation of handle 35 in order to open the door from the inside. Thereby, opening of the door by children or the mentally handicapped is inhibited. In order to open the door from the inside, it is necessary to depress the free end of lever 40 to pivot the lever against the action of spring 43 and release tooth 42 from notch 34' of the stem 34 whereupon the door can now be opened by turning the handle 35 to retract the bolt d.

The switch 31 in the housing a is normally open and when the bolt d is retracted the switch 51 is closed, to energize a sound or light circuit of an alarm system for few seconds.

When the door is closed and locked as shown in FIG. 1, the latch f is in an inwardly displaced position. When the door is unlocked and opened, the U-shaped tail member 25 is retracted by the driving arm 30 and the opening 25' is located above tooth 23' of blocking arm 23 which then pivots under the action of spring 24 to insert the tooth 23' into the opening 25'. Concurrently, a lateral projection 18' on arm 23 is acted upon the lower inclined ramp surface of tooth 18 of plunger 17 causing the plunger to displace to the left in FIG. 1 resulting in projection of latch f from the door. When the door is subsequently closed, the latch f will be displaced inwardly by the door frame to cause the arm 23 to be pivoted by the action of the lower inclined ramp surface against the projection 18', to remove the tooth 23' from the opening 25', thereby enabling the U-shaped tail member 25 to return the bolt d to its extended locked position under the action of the spring 29'.

If it is desired to keep the bolt d extended in a secured position while the door is open, thereby preventing re-locking of the door inadvertently, it is only necessary to push latch f inwardly to release tooth 23' from opening 25' in the U-shaped tail member whereby the bolt d will now be projected from the door by the action of spring 29' acting on driving arm 30. In order to secure this condition, the releasable locking means 48, in the form of a transverse bolt, is displaced to lock the plunger 17 in its position in which the tooth 23' is out of opening 25'.

The operation of the lock is as follows.

Normally, the door 1 is closed and the head 13 of the locking bolt d is engaged in a cavity (not shown) in the door frame 51 in the embodiment of FIGS. 1–5. The locking bolt is biassed to its locking position by the spring 29' acting on the driving arm 30 which engages the U-shaped tail member 25. The head 20 of latch f is in the position shown in FIG. 1. The door 1 can be opened from the outside by inserting the key into the key cylinder c and rotating the driving arm 30 to the displaced position thereof shown in dotted outline in FIG. 1, provided that the security bolt 45 has not been displaced to its locking position from inside the door. When door is opened and the U-shaped tail member 35 is in the inwardly displaced position in FIG. 1, the tooth 23' on blocking arm 23 enters opening 25' in the lower branch **25*b* of the U-shaped tail member 35 to secure the latter, and thereby the bolt d in its retracted position, the latch f projecting from the door under the bias of spring 24. The door can also be opened from the inside by turning handle 35 which rotates the driving arm 30 provided that security bolt 45 has not been displaced inwardly to its locking position. Additionally, the tooth 42 of lever 40 must be removed from notch 34' in stem 34, by pivoting the lever 40 against the action of spring 43, before the door can be opened from the inside by the handle 35**.

What is claimed is:

1. A security lock for a door comprising:
   - a housing attachable to a door,
   - a key cylinder operable by a key from outside the door to turn the key cylinder between locked and unlocked states,
   - a driving arm operatively coupled to said key cylinder for being turned therewith between said locked and unlocked states,
   - a main bolt operated by said driving arm for moving between locked and unlocked conditions of the door,
   - a turnable actuator accessible from an interior side of the door, said actuator being operatively connected to said main bolt via said driving arm to move the bolt between the locked and unlocked conditions of the door as the actuator is turned,
   - an armor plate covering said key cylinder outside said door, said armor plate having a key opening aligned with a further key opening provided in said key cylinder,
   - said bolt in said locked condition being in an outwardly projected state from said door and in said unlocked condition being in an inwardly retracted state in said door,
   - means for adjusting a length dimension of said bolt to vary its position in said projected and retracted states,
   - means connecting said bolt and said driving arm for operating the bolt by said driving arm comprising:
   - a U-shaped tail member connected to said bolt, said U-shaped tail member having upper and lower branches and a base connecting said branches, said bolt including a stem connected to said base,
   - said driving arm being engaged with said upper branch of said U-shaped tail member to displace said branch, and thereby said U-shaped tail member and the bolt connected thereto, upon turning of said key cylinder towards the unlocked state,
   - a first spring acting on said driving arm to bias said driving arm to said locked condition,
   - said lower branch of said U-shaped tail member having an opening therein,
   - a blocking arm pivotably connected to said housing and including a tooth engageable in said opening in said lower branch of said U-shaped tail member to lock said U-shaped tail member and said bolt in the unlocked condition of the door,
   - a second spring acting on said blocking arm to bias the blocking arm to engage said tooth in said opening, a latch displaceably mounted in said door and positioned for undergoing movement to a displaced location when said door is closed, a plunger connected to said latch and movable therewith such that when the door is closed, said tooth is moved out of said opening in the lower branch of said U-shaped tail member by said plunger and said first spring returns the bolt to said locked condition, and locking means accessible from said interior side of the door for preventing the bolt from being moved to its unlocked condition, thereby maintaining the door in locked condition, even when the key cylinder is attempted to be turned by the key.

2. A security lock as claimed in claim 1, further comprising an additional locking means accessible from said interior side of the door for releasably blocking turning of said actuator.

3. A security lock as claimed in claim 2, wherein said additional locking means comprises a spring-loaded lever having a biassed engaged position in which the lever prevents turning of the actuator and a released position in which the actuator is free to be turned.

4. A security lock as claimed in claim 1, wherein said plunger has a tooth with an inclined ramp surface adjacent to said blocking arm to pivotably move said blocking arm and move said tooth on the arm out of said opening in the lower branch of the U-shaped tail member.

5. A security lock as claimed in claim 1, wherein said locking means comprises a movable bolt having a lock position in which said movable bolt is adjacent to said driving arm to prevent rotation thereof and a displaced position in which said driving arm is free to rotate.

6. A security lock as claimed in claim 1, wherein said armor plate is made of metal and has a truncated, conical shape.

7. A security lock as claimed in claim 6, wherein said door is provided with an opening in which said housing is supported, said security lock further comprising a support plate for said key cylinder secured to said armor plate, said key cylinder being secured in a position in which said further key opening in the key cylinder is aligned with said key opening in said armor plate.

8. A security lock as claimed in claim 1, wherein said armor plate is made of metal and is flat, said key cylinder being mounted in an opening provided in said door, said key opening in said armor plate being aligned with the key opening in the key cylinder.

9. A security lock as claimed in claim 1, comprising screws securing said armor plate to said door, said screws having non-circular portions fitted in said door so that said screws are non-rotatable in said door, said screws having rounded heads at the outside of said door and threaded ends opposite said heads, and nuts on said threaded ends of said screws securing said screws to said door.

10. A security lock as claimed in claim 1, comprising an electrical switch for an alarm system positioned in said housing for being closed by said U-shaped tail member when the latter is displaced upon unlocking the door.

11. A security lock as claimed in claim 1, comprising a further locking means for locking said plunger in a position thereof corresponding to the displaced location of said latch whereby said tooth on said blocking arm is prevented from engaging in said opening in the lower branch of said U-shaped tail member.

12. A security lock as claimed in claim 1, wherein said latch has an end of rounded symmetrical form usable for left and right opening doors.

13. A security lock as claimed in claim 1, comprising means connecting the latch and said plunger for varying a projected distance of the latch from the housing when the door is opened.

14. A security lock as claimed in claim 1, wherein said housing is fixed to the inside of said door.

15. A security lock as claimed in claim 1, comprising a reinforcing member on said door covering said bolt from outside said door, said reinforcing member having an end covered by said armor plate, and screws securing said end of said reinforcing member to said door, said screws being covered by said armor plate.

16. A security lock as claimed in claim 1, wherein said U-shaped tail member and said driving arm are mounted in said housing, guide means being provided in said housing for guiding displacement of said U-shaped tail member, said first spring being connected to said driving arm and to said housing, said plunger being slidably mounted in said housing for movement therein when said latch is moved.

* * * * *